United States Patent [19]
Garcia

[11] 3,873,965
[45] Mar. 25, 1975

[54] TIRE PRESSURE MONITORING SYSTEM

[76] Inventor: George E. Garcia, 2349 Spanish Trl., Tiburon, Calif. 94920

[22] Filed: Apr. 18, 1974

[21] Appl. No.: 462,082

[52] U.S. Cl. .............................. 340/58, 200/61.25
[51] Int. Cl. .......................................... B60c 23/02
[58] Field of Search ........ 340/58; 200/61.22, 61.25; 325/111, 117

[56] References Cited
UNITED STATES PATENTS
3,723,966  3/1973  Mueller et al. ...................... 340/58

*Primary Examiner*—Alvin H. Waring
*Attorney, Agent, or Firm*—Owen, Wickersham & Erickson

[57] ABSTRACT

A tire pressure monitoring system for providing an indication in a vehicle that one of its tires is losing its normal inflation pressure. The system comprises a pressure responsive actuator within each tire in the system including an extensible portion that is normally retracted and shielded when tire pressure is normal. The extensible portion of the actuator is covered with a material sensitive to R.F. energy. Mounted adjacent to each tire of the system is an R.F. energy transmitter directed toward the tire and an accompanying receiver. Loss of pressure in a tire causes the actuator to extend and expose its R.F. sensitive portion, thereby causing a signal disturbance in the R.F. receiver which is connected to an indicator in the vehicle.

12 Claims, 7 Drawing Figures

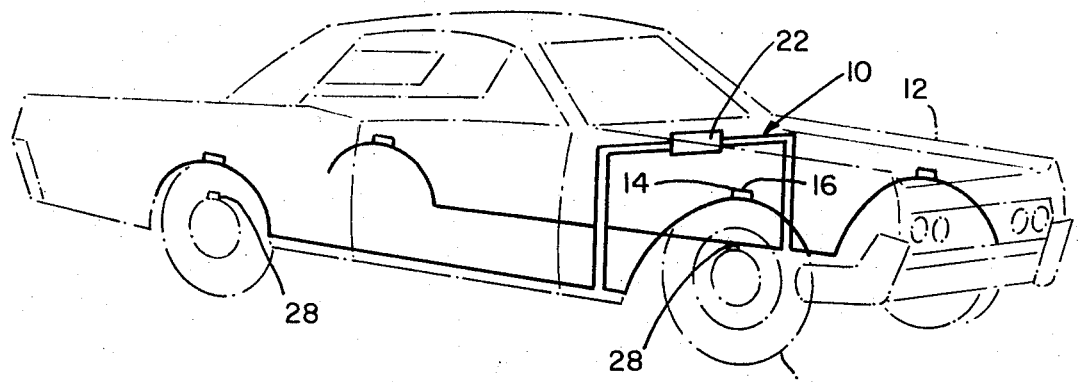
FIG_1
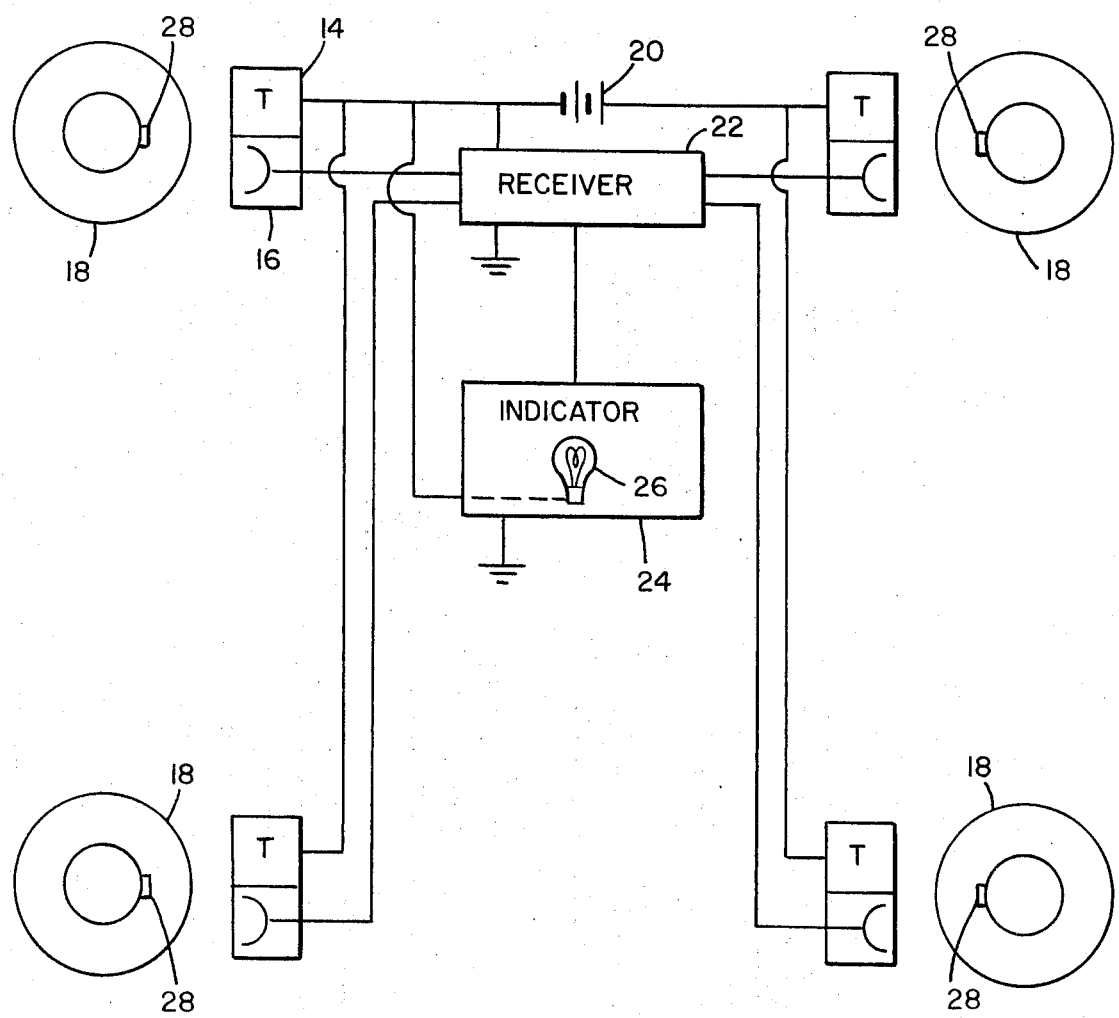
FIG_2

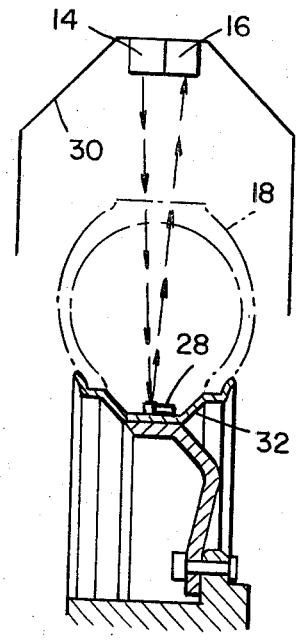
FIG_3
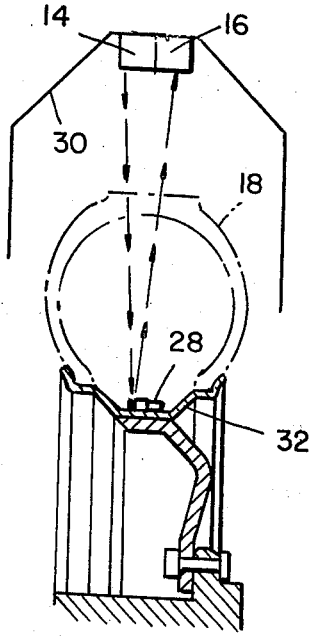
FIG_4
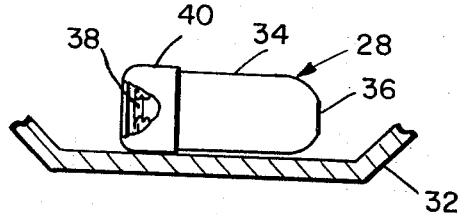
FIG_5
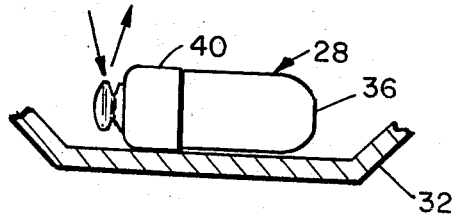
FIG_6
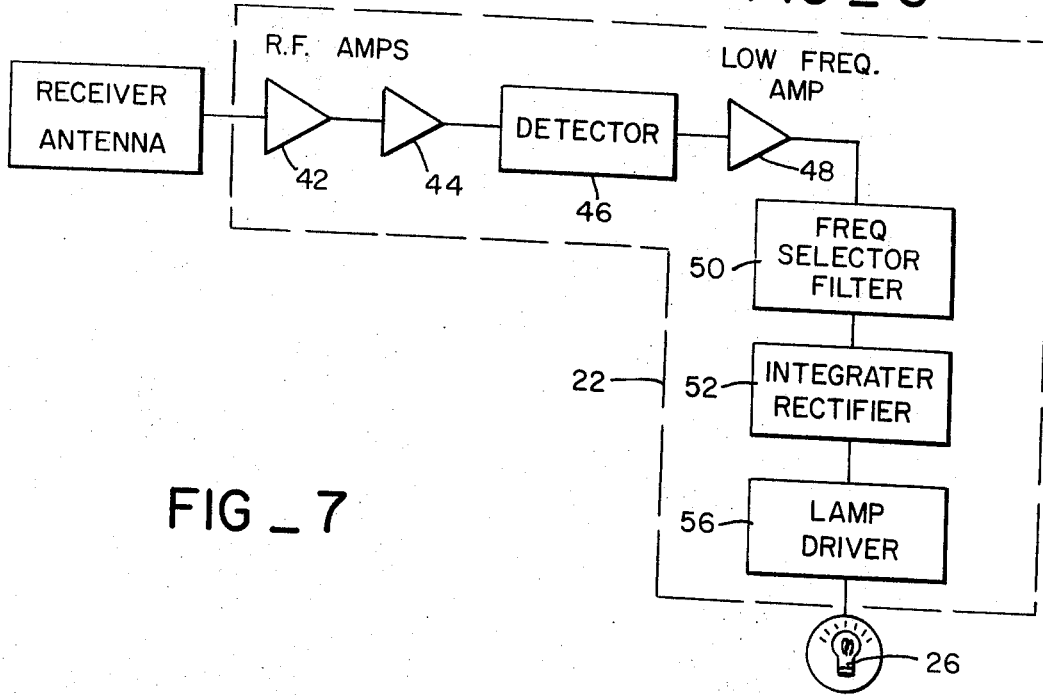
FIG_7

TIRE PRESSURE MONITORING SYSTEM

This invention relates to a method and apparatus for monitoring the pressure within an enclosure and in particular for monitoring the pressure within each of the tires on a vehicle.

The maintenance of proper inflation pressure within the tires of a vehicle is essential not only to prevent excessive tire wear and provide smooth riding characteristics, but also for proper vehicle operation from the standpoint of both safety and economy. Heretofore, many devices developed for monitoring tire pressure proved to be generally unsatisfactory for various reasons. In most instances the pressure sensing apparatus was complicated, bulky, expensive to manufacture and had to be mounted on the vehicle wheel outside of the tire. Most of these aforesaid disadvantages were overcome by a tire pressure monitoring device described in my earlier U.S. Pat. No. 3,533,063. This latter device was adapted for installation within the tire and thus overcame problems of tampering or theft inherent with other prior art devices which were mounted outside the tire. However, my previous tire pressure monitoring device utilized an active, electrically powered signalling transmitter and thus required an electrical power source within the tire. Failure or exhaustion of this power source made it necessary to deflate the tire in order to remove and replace it. The present invention solves this problem by providing a pressure monitoring device that does not require an active power source within the tire.

SUMMARY OF THE INVENTION

It is therefore one general object of the present invention to provide an improved method for monitoring pressure within a confined space and one that does not require an active signal to be transmitted from the space.

Another object of my invention is to provide an apparatus for carrying out the aforesaid method.

Another more specific object of my invention is to provide an apparatus for monitoring the pressure within the tire on a vehicle wherein R.F. energy is directed into the tire from a transmitter on the vehicle and an actuator device within the tire is responsive to a pressure variation to cause a change in the reflected R.F. energy directed back from the tire to a receiver on the vehicle.

Another object of the present invention is to provide a tire pressure monitoring apparatus which requires no active transmission device or power source within the tire.

Another object of the present invention is to provide a tire pressure monitoring apparatus which requires no calibration or presetting and sets itself automatically to the desired pressure level to be monitored when the tire is inflated.

Other objects of the present invention are to provide a tire pressure monitoring apparatus which utilizes an actuator device that is relatively small, compact and thus easily installable within a tire; that is rugged and durable; and that is particularly adaptable for ease and economy of manufacture.

The above objects are accomplished by an apparatus comprising, on a vehicle, a radio transmission means mounted on part of the vehicle structure adjacent to a tire which beams a continuous level of R.F. energy towards the tire. Mounted within the tire or on the wheel rim within the tire is a pressure sensitive actuator. This actuator has a movable or extendable portion that remains normally retracted within a cocoon-like shielded enclosure as long as the tire remains at its normal inflation pressure. If this pressure decreases because of tire leakage, the extendable portion of the actuator is activated to project outside of its shielded cocoon. Covering the surface of the extendable actuator portion is a material which reflects R.F. energy in a different manner than the surrounding material, so essentially the extendable actuator portion becomes a signal interrupter or scrambler. Thus, when the coated actuator portion extends into the R.F. energy beam the reflected beam is altered or disturbed and this change or disturbance is detected by an R.F. energy receiver unit that is also mounted in the vehicle, preferably near the transmitter unit. The receiver unit is connected through a circuit for processing the returned signal to a suitable display located at an appropriate place in the vehicle where it can be readily monitored.

Other objects, advantages and features of the invention will become apparent from the following detailed description of one embodiment presented in conjunction with the accompanying drawing.

BRIEF DESCRIPTION OF THE DRAWING

FIG. 1 is a view in perspective of a tire pressure monitoring apparatus shown in somewhat schematic form in a typical installation for a vehicle depicted in phantom;

FIG. 2 is a diagrammatic view of the tire pressure monitoring apparatus of FIG. 1;

FIGS. 3 and 4 are fragmentary views in section showing a portion of a wheel and body structure for the vehicle of FIG. 1 and a typical installation apparatus according to the invention;

FIG. 5 is an enlarged view in section of the pressure responsive actuator for the monitoring apparatus of FIGS. 1–3;

FIG. 6 is a view similar to FIG. 3, showing the pressure responsive device with its R.F. sensitive portion extended due to reduced pressure in the tire; and FIG. 7 is a block diagram showing how the reflected R.F. energy is processed for the system indicator.

Referring to the drawing, FIG. 1 shows a tire pressure monitoring apparatus 10 embodying the principles of the present invention as it appears when installed in a typical vehicle 12 such as an automobile, shown in phantom. The same apparatus is shown in schematic form in FIG. 2. In general, the apparatus is comprised of a radio frequency (R.F.) transmitter 14 and a receiver-antenna 16 which may be combined as one unit for each tire 18. Each of these R.F. units is mounted by suitable means on the structure of the vehicle near the tire which it is intended to monitor. As shown in FIG. 2, each R.F. unit is connected to a power source 20 which may be the main vehicle battery. Each receiver-antenna section of the R.F. units is connected to a receiver 22 which in turn is connected to a display unit 24. The latter is preferably located on or near the vehicle dashboard where it is readily visible to the operator. This display unit includes a suitable visual indicator 26 such as a small lamp, a light emitting diode, or some other electrically controllable indicator device. Mounted within each tire of the vehicle is a pressure sensitive device 28 which functions so that it will expose an R.F. sensitive portion when the tire pressure falls below a normal, preset level.

Now, as seen in FIGS. 3 and 4, which illustrate a typical installation of my tire monitoring apparatus in greater detail, the R.F. transmitter and receiver-antenna units 14 and 16 are secured to the inside surface of the vehicle fender structure 30, just above the tire 18. The pressure sensitive device 28 is located within the tire which is mounted on its vehicle wheel 32 in the conventional manner. The tire shown, for purposes of illustration, is a conventional tubeless tire and the device 28 is mounted on the outer surface of the wheel rim between the tire sidewalls. However, tires with tubes could be used with the present invention, in which case (not shown) the device 28 could be fixed to the inside of or adjacent to the tube. The R.F. transmitter unit 14 which may be of any suitable form, such as a conventional low frequency tone signal type designed to transmit energy in the frequency range of 2,600-2,700 megahertz at a relatively low power output. The pressure sensitive actuator device 28 is shown in an enlarged view in greater detail in FIG. 5. Essentially, it comprises a relatively small vessel 34 having an inlet check valve 36 at one end and a normally retracted but extendable portion 38 at its other end. The vessel may be made from a strong and rigid or semi-rigid plastic material and the attached extendable portion has a bellows-like configuration with integral portions that are normally folded together and form a movable end wall. The extendable portion 38 is surrounded by a generally annular shield 40 made of a protective material which prevents the penetration of R.F. energy, such as a suitable metal. As shown, this shield may be threadedly or otherwise attached to the end of vessel, or it could also be larger than shown, if desired, and could surround the entire vessel except for an opening for the extendable interrupter portion 38. In any case it is shaped so that no R.F. energy can strike the extendable portion 38 when it is normally retracted within the shield.

When the tire is inflated, the inlet check valve 36 in the vessel 34 for each actuator allows air to enter the vessel and remain at the same pressure as provided within the tire surrounding the vessel. Thus, under normal tire conditions there is no pressure differential between the inside and outside of the vessel which would cause the extendable portion 38 to be activated. Under these circumstances, a relatively constant, predictable level of R.F. energy is being reflected back to the receiver-antenna 16. However, if a leak develops in the tire and causes it to lose pressure, the pressure within the vessel will not change because air is retained by the check valve. This causes a greater pressure to exist inside of the actuator 28 than its surrounding pressure and as a result the extendable portion 38 of the pressure sensitive device 28 is pushed outwardly beyond its shield 40. A more detailed description of the aforesaid actuator device 28 may be found in my co-pending application Ser. No. 462,081 filed on Apr. 18,1974. 18, 1974.

The folds of the extendable portion 38 of the actuator 28 are coated with a material such as a magnetized material similar to magnetic tape that will interrupt or distort an R.F. signal when exposed to the signal. Thus, due to the loss of pressure within the tire, the R.F. actuator portion 38 becomes a signal changing means as it moves out beyond its shield 40 and into the beam of R.F. energy that is constantly being directed toward the tire by the transmitter 14, as shown in FIG. 3. That is the return signal to the R.F. receiver-antenna 16 is altered from its normal level due to the reflections or distortions of signal energy from the extended actuator or interrupter portion 38. This reflected R.F. energy change detected in any one tire is furnished from an antenna 16 to the central receiver 22 which is connected to the display unit 24.

The elements of a typical receiver unit 22 suitable for processing the signal change from an interrupter means 38 in my apparatus is shown in block diagram form in FIG. 7. Each antenna unit 16 is connected to the receiver which comprises a pair of R.F. amplifiers 42 and 44 connected in series, the second amplifier being fed to a detector 46 which is tuned to operate at a preselected level. The detector output is fed to another low frequency amplifier 48 whose output is furnished to a frequency selector filter 50. The latter filter is connected through an integrator rectifier 52 to a lamp driver 54 which is connected directly to a lamp or indicator 26 on the display unit 24.

The operation of my tire pressure monitoring system 10 may now be summarized. After each tire, provided with a pressure sensitive or sensor-actuator device 28, has been inflated to its normal pressure, the vessel 34 of each actuator device 28 has the same internal pressure as that within the tire itself. With the apparatus in the "on" mode, the R.F. transmitter for each tire functions to direct a beam of R.F. energy toward the tire and the hub of its wheel. As long as the tire pressure remains normal, the R.F. energy is reflected back to the receiver-antenna unit 16 at a frequency "X," and the elements of the receiver 22 will not react to put out a signal to the display unit 24. Now, if pressure in one or more tires falls below its original inflated pressure, the sensor-actuator 28 in that tire will react and cause its extendable interrupter portion 38 to move outside of its shield 40. This introduces an added R.F. reflection or disturbance factor into the beam of R.F. energy. In other words, the R.F. reflected beam to the receiver-antenna 16 is interrupted by the extended actuator portion 38 and causes the characteristic of the original transmitted signal of frequency X to change to a reflected signal of frequency "Y." When this occurs, the frequency shift is detected in the receiver 22 and produces an output which activates the indicator lamp 26 on the display unit 24. This activation of the display lamp takes place in a fraction of a second after the loss of tire pressure occurs.

From the foregoing it is apparent that the present invention provides a tire pressure monitoring system having important advantages. One basic advantage is derived from the fact that the sensor-actuator 28 requires no power source within the tire. Once installed, it is ready to perform its function and it is not necessary to deflate the tire to replace a battery as in prior devices. Also, the interrupter actuator 38 for each tire is self adjusting and it is not necessary to deflate the tire and gain access to the actuator to the actuator in order to set it for a different inflation pressure in the tire. The actuator is set automatically when the tire is inflated to activate when any loss in this original inflation pressure occurs. The actuator, being within the tire, is tamper-proof and protected from outside forces. Another advantage of the present apparatus is that a standard combination of components is readily applicable to a wide range of vehicle types and sizes having different sizes of tires that may operate with various inflation pressures. Moreover, the entire apparatus can be made small, compact and economical using microelectronic design techniques well known to those skilled in the art.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. For use on a vehicle having a plurality of inflatable tires, a tire pressure monitoring system comprising:
   a pressure sensitive device mounted within each of the tires, each said device having a normally shielded portion thereof which is extendable in response to a reduction in pressure within the tire and around the device, said extendable portion having a surface that is sensitive to R.F. energy;
   an R.F. transmitter unit mounted on said vehicle adjacent each of its tires and positioned so as to direct a beam of R.F. energy toward an adjacent tire and said pressure sensitive device therein;
   antenna means for sensing R.F. energy that is reflected from the tire;
   receiver means connected to said antenna means for detecting the change in the reflected R.F. energy from a tire when its said device is activiated to extend its R.F. sensitive portion; and
   display means connected to said receiver means for providing an indication of the reduced tire pressure when its said device is activated.

2. The tire pressure monitoring system described in claim 1 wherein said pressure sensitive device comprises a small vessel having an inlet-check valve for allowing air to enter the vessel at the same pressure as in the tire, said extendable portion comprising a series of bellow-like folds, normally surrounding a shield means, which extend from said shield means when the pressure inside the vessel exceeds the pressure outside of it.

3. The tire pressure monitoring system described in claim 1 wherein said R.F. transmitter unit and said antenna unit for each tire is mounted on the vehicle adjacent the tire.

4. The tire pressure monitoring system described in claim 1 wherein said receiver means comprises an amplifying means for receiving signals from said receiver-antenna unit, means connected to said amplifying means for detecting a change in signal level from a predetermined level normally received when said pressure sensitive device has not been activated, and means for amplifying and filtering the detected signal for driving an indicator means on said display means.

5. A system for monitoring the pressure in a confined space comprising:
   a pressure sensitive device mounted within said confined space, said device having a normally shielded portion thereof which is extendable in response to a reduction in pressure within the space and around the device, said extendable portion having a surface that is sensitive to a beam of energy applied to said normally shielded portion when it is extended;
   an energy transmission means positioned so as to direct a beam of energy toward said pressure sensitive device within the confined space;
   signal sensitive means adjacent said transmission means for receiving energy that is reflected from said device and surrounding structure;
   signal processing means connected to said signal sensitive means for detecting the change in said reflected energy from said device when it is activated to extend its sensitive portion; and
   display means connected to said signal processing means for providing an indication of the reduced pressure within said confined space when said device is activated.

6. The system as described in claim 5 wherein said energy transmission means comprises an R.F. signal transmitter and said signal sensitive means includes an R.F. sensitive antenna.

7. The system as described in claim 5 wherein said confined space is an inflatable tire mounted on a vehicle, said pressure sensitive device being located within said tire and said energy transmission means being located outside of said tire.

8. The system as described in claim 7 wherein said vehicle has a body with fenders and a dashboard and said energy transmission means and said signal sensitive means for each tire are mounted adjacent to each other on the inside of a fender for the tire, said display means being mounted on said dashboard.

9. The system as described in claim 7 wherein said signal processing means comprises a first R.F. amplifying means connected to said signal sensitive means, detector means connected to said first amplifying means, second amplifying means connected to said detector means, filtering means for isolating signals of a preselected characteristic and rectifier means for conditioning the detected and filtered signals for actuating by said display means.

10. The pressure monitoring system described in claim 5 wherein said pressure sensitive device comprises a small vessel having an inlet-check valve for allowing air to enter the vessel at the same pressure as in the tire, said extendable portion comprising a series of bellows-like folds, shielding means normally surrounding said extendable portion, said extendable portion being movable outwardly from said shield means when the pressure inside the vessel exceeds the pressure outside of it.

11. The pressure monitoring system described in claim 10 including a surface coating on said extendable portion of said pressure sensitive device which is sensitive to and causes changes in R.F. energy that impinges upon said coating.

12. The pressure monitoring system described in claim 7 wherein said R.F. transmitter unit and signal sensitive means for said tire is mounted on the vehicle adjacent the tire.

* * * * *